(12) United States Patent
Tseng

(10) Patent No.: US 6,508,479 B1  
(45) Date of Patent: Jan. 21, 2003

(54) WAGON WITH WHEEL BRAKING DEVICE

(75) Inventor: Chuen-Jong Tseng, Chiayi Hsien (TW)

(73) Assignee: Shin Yeh Enterprise Co., Ltd., Chiayi Hsien (TW)

( * ) Notice: Subject to any disclaimer, the term of this patent is extended or adjusted under 35 U.S.C. 154(b) by 0 days.

(21) Appl. No.: 09/940,908

(22) Filed: Aug. 28, 2001

(51) Int. Cl.$^7$ .............................................. B62B 3/00
(52) U.S. Cl. ............................ 280/47.34; 280/47.11; 188/21; 188/22
(58) Field of Search .................... 280/47.11, 47.371, 280/47.34, 33.991, 79.11; 188/19, 21, 22, 29, 74, 9

(56) References Cited

U.S. PATENT DOCUMENTS

| | | | | |
|---|---|---|---|---|
| 809,912 A | * | 1/1906 | Ferris | 188/21 |
| 988,680 A | * | 4/1911 | Wagner | 188/21 |
| 1,520,941 A | * | 12/1924 | Funk | 188/21 |
| 1,567,922 A | * | 12/1925 | De Spain | 188/21 |
| 1,701,188 A | * | 2/1929 | Miller | 188/22 |
| 1,715,938 A | * | 6/1929 | Miller | 188/22 |
| 1,785,432 A | * | 12/1930 | Beatty | 188/21 |
| 2,169,781 A | * | 8/1939 | Abresch | 188/119 |
| 2,389,320 A | * | 11/1945 | Nance | 188/21 |
| 3,313,378 A | * | 4/1967 | Freeman et al. | 188/21 |
| 3,486,587 A | * | 12/1969 | Malloy | 188/22 |
| 3,532,188 A | * | 10/1970 | Ketz | 188/119 |
| 3,551,001 A | * | 12/1970 | Wilson | 188/119 |
| 4,134,599 A | * | 1/1979 | DiMille et al. | 188/29 |
| 4,949,986 A | * | 8/1990 | Gohier | 280/410 |
| 5,531,295 A | * | 7/1996 | Kopman et al. | 188/17 |
| 5,735,367 A | * | 4/1998 | Brubaker | 188/1.12 |

* cited by examiner

Primary Examiner—Brian L. Johnson  
Assistant Examiner—Kelly E Campbell  
(74) Attorney, Agent, or Firm—Ladas & Parry

(57) ABSTRACT

A wagon includes a cart body having front and rear wheel units mounted on a bottom side. A steering rod is connected pivotally to a pivot seat that is connected to the front wheel unit. A wheel braking device includes a transmission unit interconnecting the steering rod and a pair of brake plates that are connected pivotally to a rear end of the cart body. The steering rod is operable so as to dispose the cart body in a selected one of a movable state, wherein the steering rod is pivoted away from a front end of the cart body such that the brake plates are moved by the transmission unit rearwardly and away from the rear wheel unit, and a stationary state, wherein the steering rod is pivoted toward the front end such that the brake plates are moved by the transmission unit forwardly and toward the rear wheel unit.

3 Claims, 6 Drawing Sheets

WAGON WITH WHEEL BRAKING DEVICE

BACKGROUND OF THE INVENTION

1. Field of the Invention

The invention relates to a wagon, more particularly to a wagon with a wheel braking device.

2. Description of the Related Art

FIG. 1 illustrates a conventional wagon 1 that includes a cart body 11 for disposing goods thereon, and a steering rod 14. The cart body 11 has opposite front and rear ends, a bottom side 10, a front wheel unit 12 mounted on the bottom side 10 adjacent to the front end, and a rear wheel unit 13 mounted on the bottom side 10 adjacent to the rear end. The front wheel unit 12 includes a front support seat 121 connected pivotally to the bottom side 10, and a pair of front wheels 122 carried by the front support seat 121. The rear wheel unit 13 includes a rear support seat 131 and a pair of rear wheels 132 carried by the rear support seat 131. The steering rod 14 has an upper grip portion 141, and a lower pivot portion connected pivotally to the front support seat 121 by means of a pivot bolt 140 such that the upper grip portion 141 is rotatable relative to the front support seat 121.

The conventional wagon 1 can be moved by manual operation of the steering rod 14. For lack of a brake function, the conventional wagon 1 can hardly be retained in a stationary state when the conventional wagon 1 is disposed on a slope, thereby resulting in inconvenience and danger during use.

SUMMARY OF THE INVENTION

Therefore, the object of the present invention is to provide a wagon with a wheel braking device so as to ensure safety during use.

According to the present invention, a wagon comprises:

a cart body adapted for disposing goods thereon, the cart body having opposite front and rear ends, a bottom side, a front wheel unit mounted on the bottom side adjacent to the front end, and a rear wheel unit mounted on the bottom side adjacent to the rear end, the front wheel unit including a front support seat and a pair of front wheels carried by the front support seat, the rear wheel unit including a rear support seat and a pair of rear wheels carried by the rear support seat;

a pivot seat connected to the front support seat of the front wheel unit;

a steering rod having an upper grip portion, a lower coupling portion opposite to the upper grip portion, and an intermediate rod portion interconnecting the upper grip portion and the lower coupling portion and connected pivotally to the pivot seat such that the upper grip portion and the lower coupling portion are rotatable relative to the pivot seat; and a wheel braking device including a pair of brake plates, each of which is disposed rearwardly of a respective one of the rear wheels and has a first end portion connected pivotally to the rear end of the cart body, and a second end portion opposite to the first end portion, and a transmission unit interconnecting the lower coupling portion of the steering rod and the second end portions of the brake plates;

the steering rod being operable so as to dispose the cart body in a selected one of a movable state, wherein the upper grip portion of the steering rod is pivoted away from the front end of the cart body, and the lower coupling portion of the steering rod moves toward the front end of the cart body such that the second end portions of the brake plates are moved by the transmission unit rearwardly and away from the rear wheels to prevent contact between the brake plates and the rear wheels, and a stationary state, wherein the upper grip portion of the steering rod is pivoted toward the front end of the cart body, and the lower coupling portion of the steering rod moves away from the front end of the cart body such that the second end portions of the brake plates are moved by the transmission unit forwardly and toward the rear wheels for braking the rear wheels, respectively.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
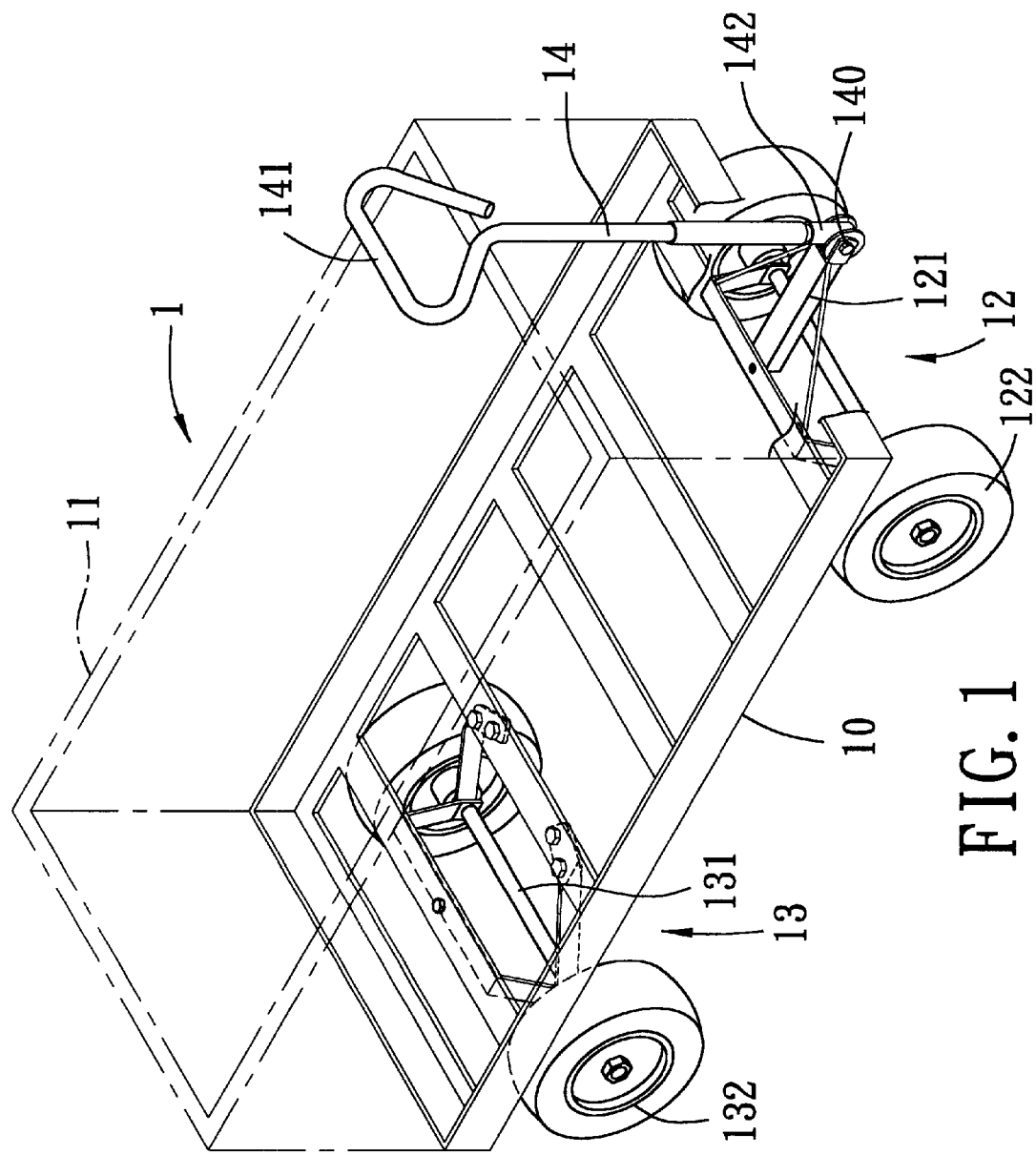
FIG. 1 is a perspective view showing a conventional wagon.
Figure 2:
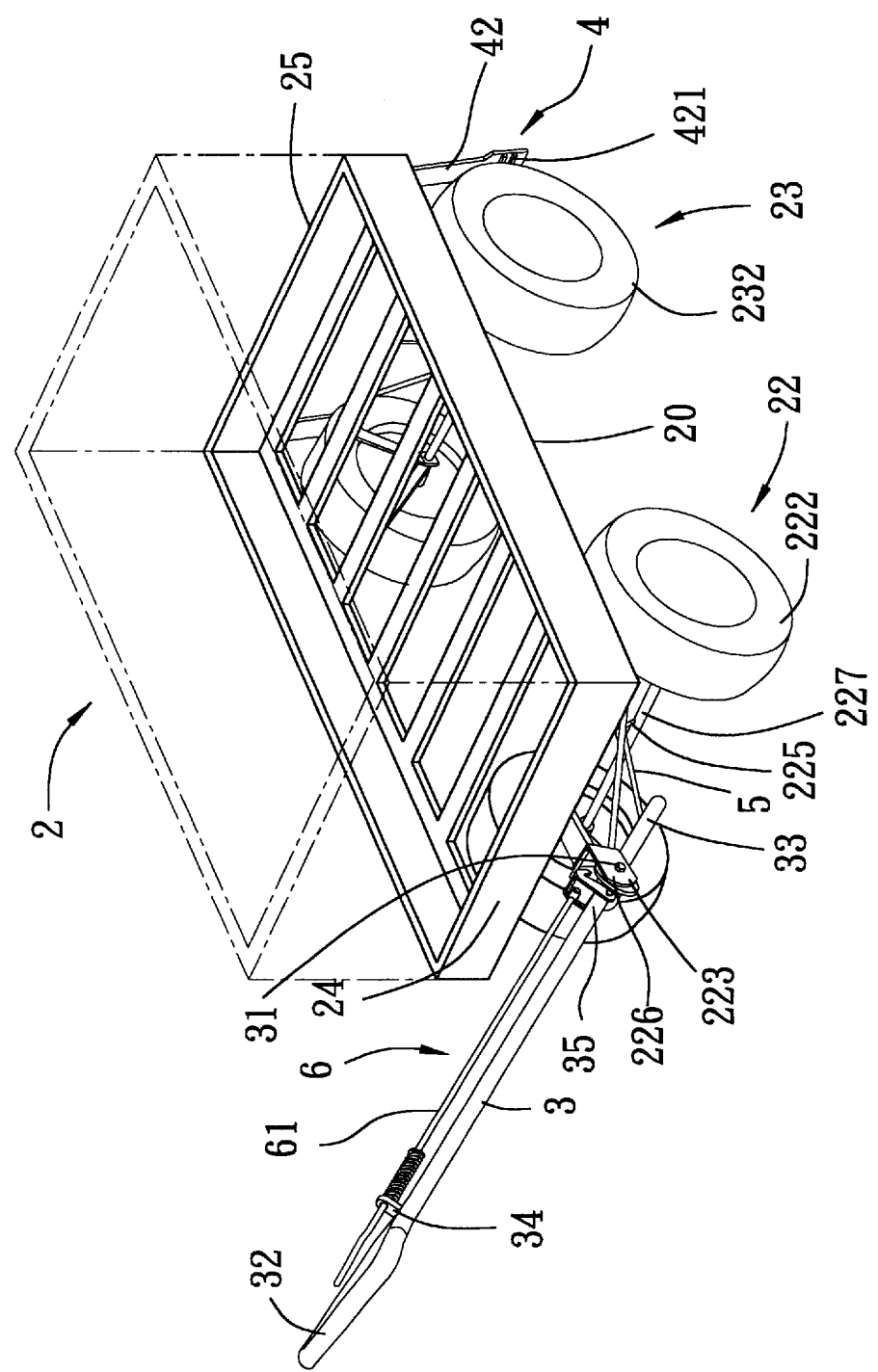
FIG. 2 is a perspective view showing the preferred embodiment in a movable state according to the present invention.
Figure 3:
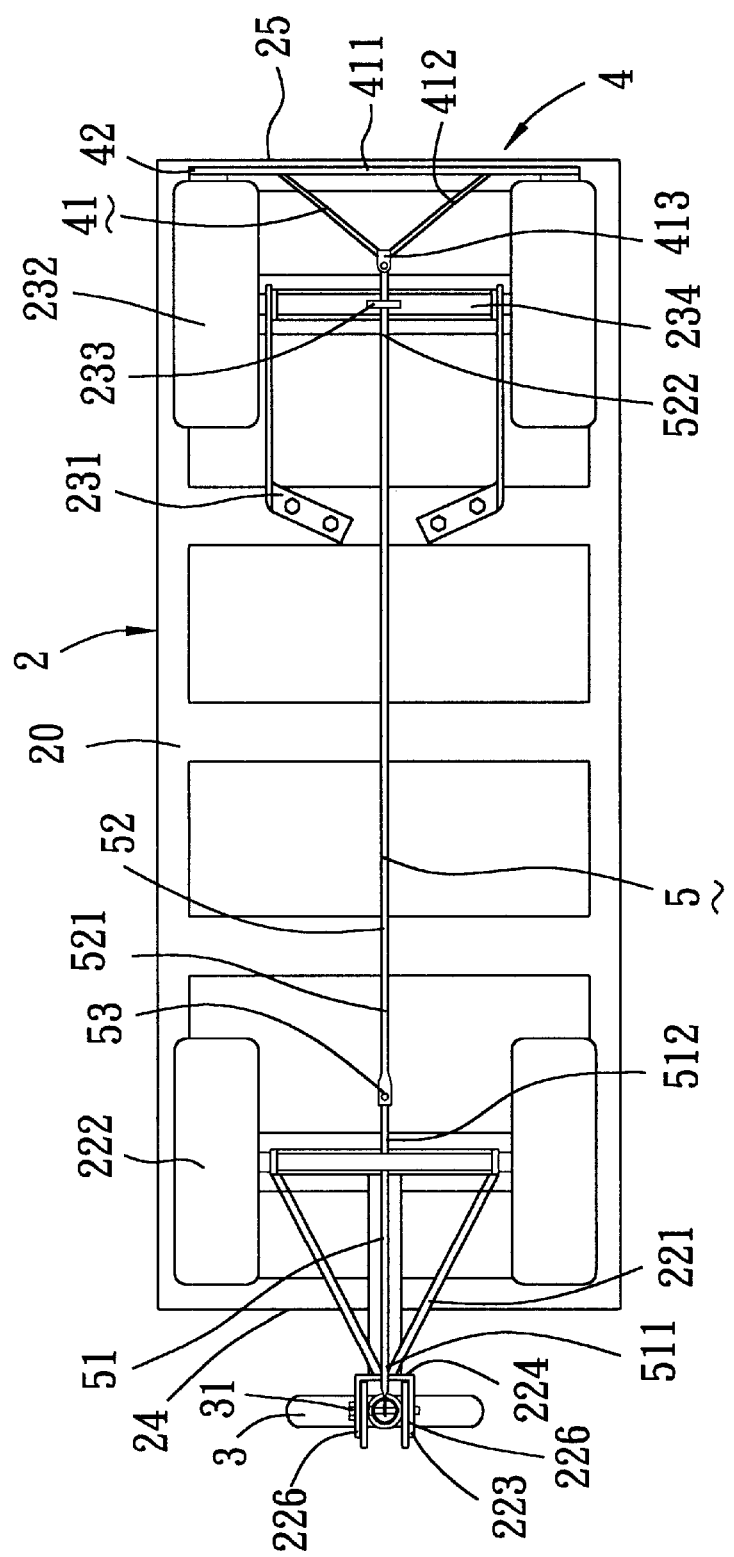
FIG. 3 is a schematic bottom view showing the preferred embodiment in a stationary state.
Figure 4:
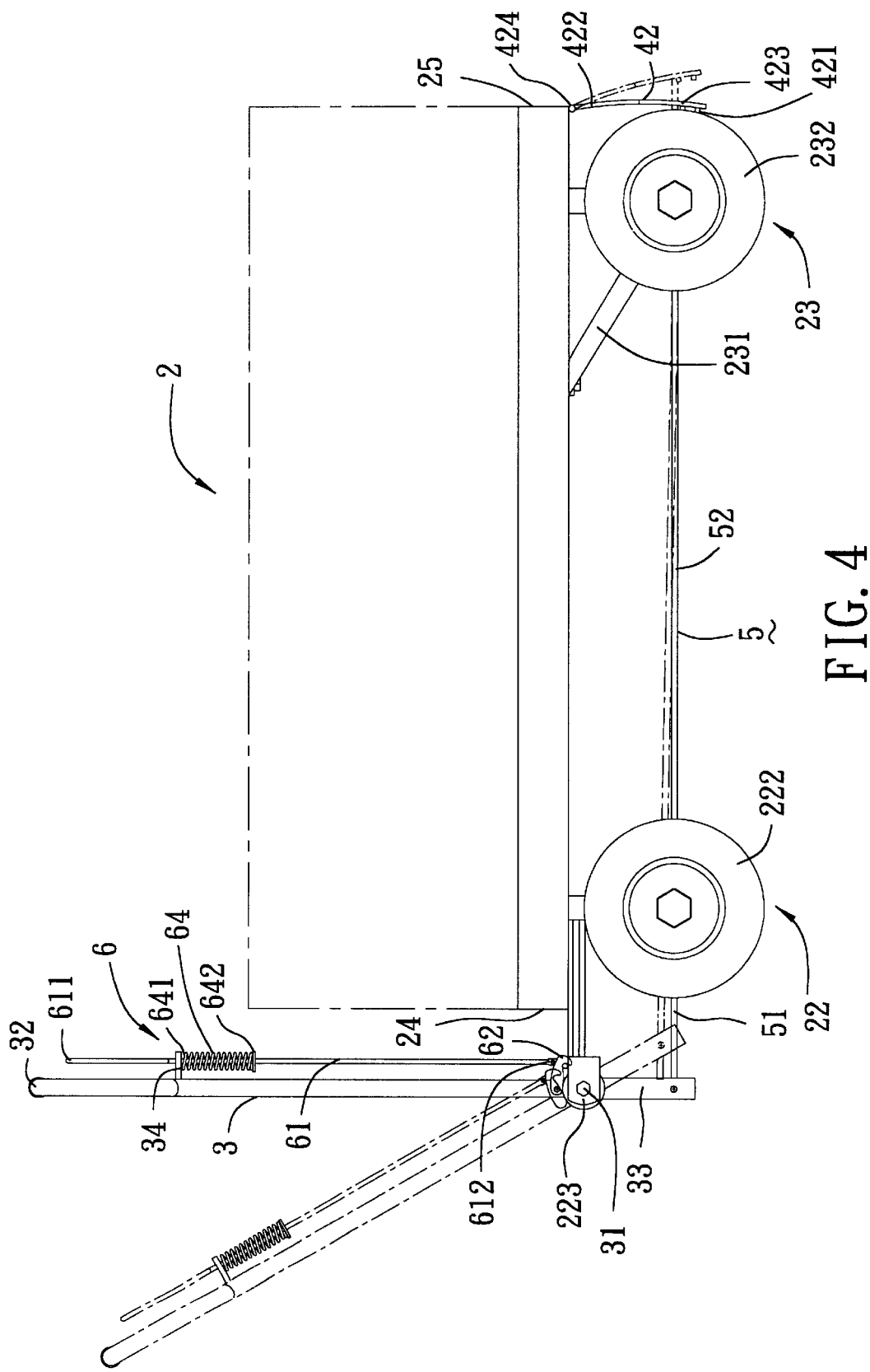
FIG. 4 is a schematic side view showing the preferred embodiment in the stationary state.

Referring to FIGS. 2 to 4, according to the preferred embodiment of the present invention, a wagon is shown to include a cart body 2, a pivot seat 223, a wheel braking device 4, and a positioning unit 6.

The cart body 2 is adapted for disposing goods (not shown) thereon, and has opposite front and rear ends 24, 25, a bottom side 20, a front wheel unit 22 mounted on the bottom side 20 adjacent to the front end 24, and a rear wheel unit 23 mounted on the bottom side 20 adjacent to the rear end 25. The front wheel unit 22 includes a front support seat 221, and a pair of front wheels 222 carried by the front support seat 221. A front axle 227 interconnects the front wheels 222, and is provided with a first positioning ring 225 thereon. The rear wheel unit 23 includes a rear support seat 231 and a pair of rear wheels 232 carried by the rear support seat 231, as shown in FIG. 2. A rear axle 234 interconnects the rear wheels 232, and is provided with a second positioning ring 233 opposite to the first positioning ring 225 thereon, as shown in FIG. 3.

In this embodiment, the pivot seat 223 includes opposite lateral plates 226, and a base plate 224 interconnecting the lateral plates 226 and connected to the front support seat 221 of the front wheel unit 22.

The steering rod 3, which is made of metal, has an upper grip portion 32, a lower coupling portion 33 opposite to the upper grip portion 32, and an intermediate rod portion 35 interconnecting the upper grip portion 32 and the lower coupling portion 33 and connected pivotally between the lateral plates 226 of the pivot seat 223 by means of a pivot pin 31 such that the upper grip portion 32 and the lower coupling portion 33 are rotatable relative to the pivot seat 223.

The wheel braking device 4 includes a pair of brake plates 42 and a transmission unit 5. As shown in FIG. 4, each brake plate 42 is disposed rearwardly of a respective one of the rear wheels 232, and has a first end portion 422 connected pivotally to the rear end 25 of the cart body 2 by means of a pivot bolt 424, and a second end portion 423 opposite to the first end portion 422 such that the second end portion 422 of each brake plate 42 is rotatable relative to the pivot bolt 424. The second end portion 422 of each brake plate 422 is provided with a pair of brake pads 421 for braking the respective one of the rear wheels 232. The transmission unit 5 interconnects the lower coupling portion 33 of the steering rod 3 and the second end portions 423 of the brake plates 42. In this embodiment, the transmission unit 5 includes a first transmission rod 51, a second transmission rod 52 and a brake frame 41. The first transmission rod 51 has a first front end 511 connected pivotally to the lower coupling portion 33 of the steering rod 3, and a first rear end 512 opposite to the first front end 511 and extending through the first positioning ring 225 on the front axle 227. As shown in FIG. 3, the second transmission rod 52 has a second front end 521 connected pivotally to the first rear end 512 of the first transmission rod 51 by means of a pivot screw 53, and a second rear end 522 opposite to the second front end 521 and extending through the second positioning ring 233 on the rear axle 234. The brake frame 41 has a pivot portion 413 connected pivotally to the second rear end 522 of the second transmission rod 52, a supporting portion 411 connected to the second end portion 422 of each brake plate 42, and intermediate branch portions 412 interconnecting the pivot portion 413 and the supporting portion 411. Due to the design of the first and second transmission rods 51, 52, the first transmission rod 51 can rotate with the front wheel unit 22 relative to the second transmission rod 52 when the cart body 2 turns, thereby preventing the deformation of the transmission unit 5.

Referring to FIG. 4, the steering rod 3 is operable so as to dispose the cart body 2 in a selected one of a movable state, wherein the upper grip portion 32 of the steering rod 3 is pivoted away from the front end 24 of the cart body 2, and the lower coupling portion 33 of the steering rod 3 moves toward the front end 24 of the cart body 2 such that the second end portions 423 of the brake plates 42 are moved by the transmission unit 5 rearwardly and away from the rear wheels 232 to prevent contact between the brake plates 42 and the rear wheels 232, and a stationary state, wherein the upper grip portion 32 of the steering rod 3 is pivoted toward the front end 24 of the cart body 2, and the lower coupling portion 33 of the steering rod 3 moves away from the front end 24 of the cart body 2 such that the second end portions 423 of the brake plates 42 are moved by the transmission unit 5 forwardly and toward the rear wheels 232 for braking the rear wheels 232, respectively.

Figure 5:
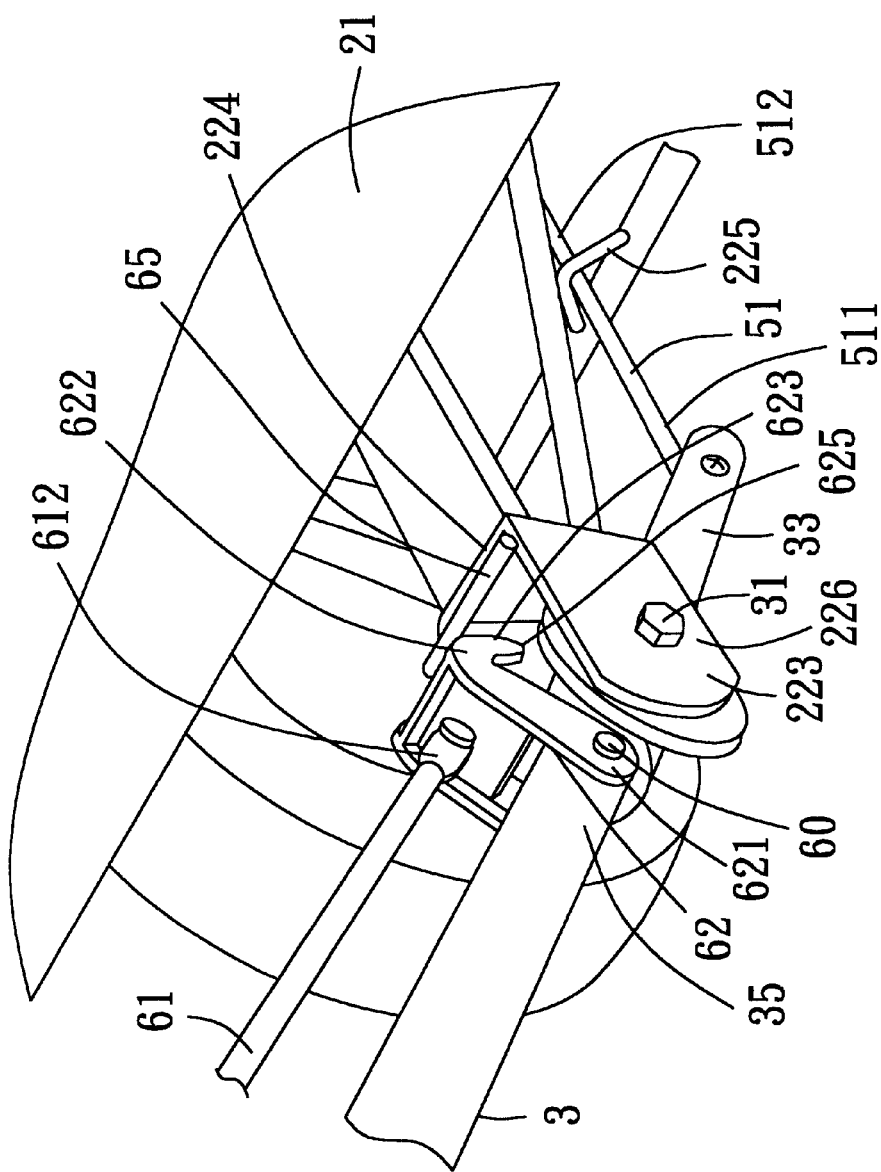
FIG. 5 is a fragmentary enlarged perspective view illustrating the relationship between an anchoring pin and a positioning block of the preferred embodiment in the movable state.

Referring to FIGS. 4 and 5, the positioning unit 6 is mounted on the steering rod 3 for releasably retaining the cart body 2 in the stationary state. The positioning unit 6 includes an anchoring pin 65, a hand rod 61, a positioning block 62 and a coil spring 64. The anchoring pin 65 is provided on the lateral plates 226 of the pivot seat 223. The hand rod 61 is mounted movably on and extends parallel to the steering rod 3. The positioning block 62 is connected pivotally to a lower coupling end 612 of the hand rod 61, and is formed with a pivot end portion 621 connected pivotally to the intermediate rod portion 35 of the steering rod 3 adjacent to the pivot seat 223, and a hook end portion 622 opposite to the pivot end portion 621 for engaging the anchoring pin 65. The hook end portion 622 has an outer bevel surface 623. As shown in FIG. 4, the steering rod 3 is formed with a positioning ring 34 through which the hand rod 61 extends. The coil spring 64 is sleeved on the hand rod 61, and has a lower fixed end 642 connected to the hand rod 61, and an upper free end 641 abutting against the positioning ring 34, thereby biasing the positioning block 62 downwardly to ensure engagement between the hook end portion 622 and the anchoring pin 65 for retaining releasably the cart body 2 in the stationary state.

Figure 7:
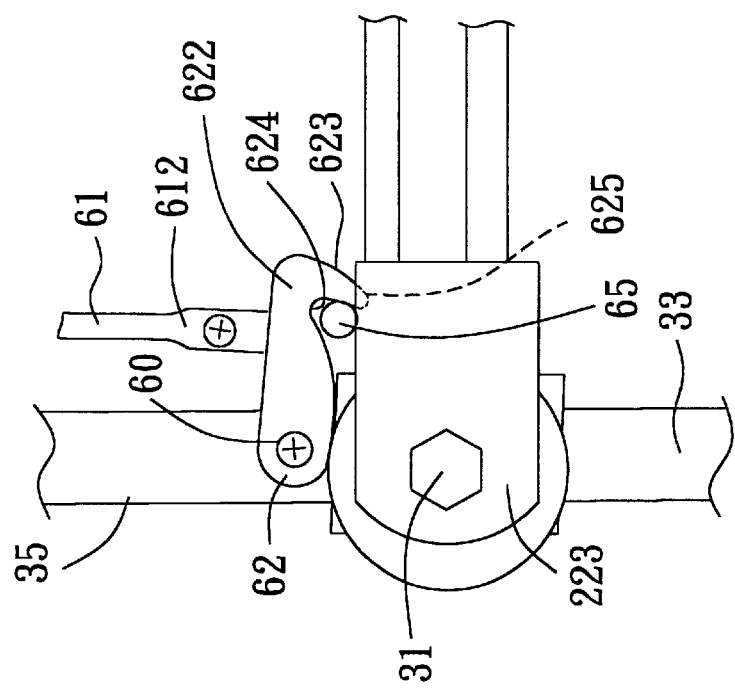
FIG. 7 is a fragmentary schematic view illustrating the relationship between the anchoring pin and the positioning block in the stationary state.
Figure 6:
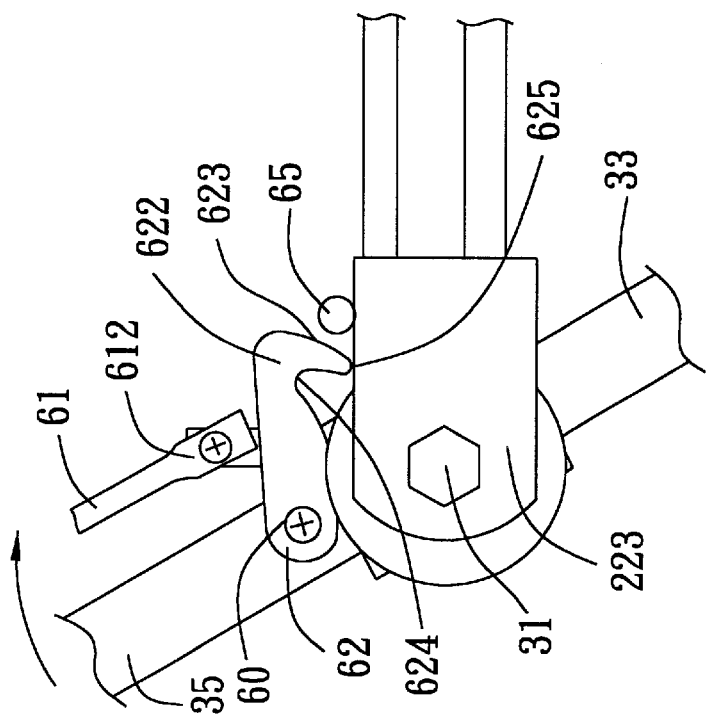
FIG. 6 is a fragmentary schematic view illustrating how a steering rod of the preferred embodiment is operated to dispose a cart body from the movable state to the stationary state.

Referring to FIGS. 6 and 7, when the upper grip portion 32 of the steering rod 3 is moved toward the front end 24 of the cart body 2 for braking, the positioning block 62 is moved toward the anchoring pin 65 and the outer bevel surface 623 of the hook end portion 622 abuts against the anchoring pin 65 such that a bottom edge 625 of the hook end portion 622 is moved past the anchoring pin 65 so as to permit the engagement between the hook end portion 622 and the anchoring pin 65. When the cart body 2 is in the stationary state, by moving upwardly the hand rod 61, the hook end portion 622 disengages the anchoring pin 65 such that the steering rod 3 can be operated to dispose the cart body 2 in the movable state.

It is noted that, due to the inclusion of the wheel braking device 4 and the positioning unit 6, the wagon of this invention achieves a braking function so as to ensure safety during use. The object of the invention is thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A wagon comprising:
    a cart body adapted for disposing goods thereon, said cartridge body having opposite front and rear ends, a bottom side, a front wheel unit mounted on said bottom side adjacent to said front end, and a rear wheel unit mounted on said bottom side adjacent to said rear end, said front wheel unit including a front support seat and a pair of front wheels carried by said front support seat, said rear wheel unit including a rear support seat and a pair of rear wheels carried by said rear support seat;
    a pivot seat connected to said front support seat of said front wheel unit;
    a steering rod having an upper grip portion, a lower coupling portion opposite to said upper grip portion, and an intermediate rod portion interconnecting said upper grip portion and said lower coupling portion and connected pivotally to said pivot seat such that said upper grip portion and said lower coupling portion are rotatable relative to said pivot seat; and
    a wheel braking device including
        a pair of brake plates, each of which is disposed rearwardly of a respective one of said rear wheels and has a first end portion connected pivotally to said rear end of said cart body, and a second end portion opposite to said first end portion;

a transmission unit interconnecting said lower coupling portion of said steering rod and said second end portions of said brake plates; and a positioning unit mounted on said steering rod for releasably retaining said cart body in the stationary state, wherein said positioning unit includes:
an anchoring pin provided on said pivot seat;
a hand rod mounted movably on and extending parallel to said steering rod; and
a positioning block connected pivotally to said hand rod and formed with a pivot end portion connected pivotally to said intermediate rod portion of said steering rod, and a hook end portion opposite to said pivot end portion for engaging said anchoring pin;

said steering rod being operable so as to dispose said cart body in a selected one of a movable state, wherein said upper grip portion of said steering rod is pivoted away from said front end of said cart body, and said lower coupling portion of said steering rod moves toward said front end of said cart body such that said second end portions of said brake plates are moved by said transmission unit rearwardly and away from said rear wheels to prevent contact between said brake plates and said rear wheels, and a stationary state, wherein said upper grip portion of said steering rod is pivoted toward said front end of said cart body, and said lower coupling portion of said steering rod moves away from said front end of said cart body such that said second end portions of said brake plates are moved by said transmission unit forwardly and toward said rear wheels for braking said rear wheels, respectively.

2. The wagon as claimed in claim 1, wherein said steering rod is formed with a positioning ring through which said hand rod extends, said positioning unit further including a coil spring sleeved on said hand rod and having a lower fixed end connected to said hand rod, and an upper free end abutting against said positioning ring, thereby biasing said positioning block downwardly to ensure engagement between said hook end portion and said anchoring pin for retaining releasability said cart body in the stationary state.

3. The wagon as claimed in claim 1, wherein said second end portion of each of said brake plates is provided with a brake pad unit for braking the respective one of said rear wheels.

* * * * *